US006987799B2

(12) United States Patent
McDonough et al.

(10) Patent No.: US 6,987,799 B2
(45) Date of Patent: Jan. 17, 2006

(54) SYSTEM AND METHOD FOR DEMODULATING ASSOCIATED INFORMATION CHANNELS IN DIRECT SEQUENCE SPREAD SPECTRUM COMMUNICATIONS

(75) Inventors: John G. McDonough, La Jolla, CA (US); Craig M. Julian, Escondido, CA (US)

(73) Assignee: Texas Instruments Incorporated, Dallas, TX (US)

( * ) Notice: Subject to any disclaimer, the term of this patent is extended or adjusted under 35 U.S.C. 154(b) by 676 days.

(21) Appl. No.: 09/848,500

(22) Filed: May 3, 2001

(65) Prior Publication Data

US 2002/0181552 A1 Dec. 5, 2002

(51) Int. Cl.
*H04B 1/69* (2006.01)
*H04B 7/216* (2006.01)

(52) U.S. Cl. .................. 375/149; 375/142; 370/342
(58) Field of Classification Search ................. 375/142, 375/147, 340; 370/320, 341, 342
See application file for complete search history.

(56) References Cited

U.S. PATENT DOCUMENTS

| 4,901,307 | A | 2/1990 | Gilhousen et al. |
| 5,056,109 | A | 10/1991 | Gilhousen et al. |
| 5,101,501 | A | 3/1992 | Gilhousen et al. |
| 5,103,459 | A | 4/1992 | Gilhousen et al. |
| 5,109,390 | A | 4/1992 | Gilhousen et al. |
| 5,228,054 | A | 7/1993 | Rueth et al. |
| 5,237,586 | A | 8/1993 | Bottomley |
| 5,267,261 | A | 11/1993 | Blakeney, II et al. |
| 5,267,262 | A | 11/1993 | Wheatley, III |
| 5,305,349 | A | 4/1994 | Dent |
| 5,383,219 | A | 1/1995 | Wheatley, III et al. |
| 5,414,728 | A | 5/1995 | Zehavi |
| 5,506,865 | A | 4/1996 | Weaver, Jr. |
| 5,757,767 | A * | 5/1998 | Zehavi ..................... 370/208 |
| 5,889,815 | A * | 3/1999 | Iwakiri .................... 375/148 |
| 5,903,550 | A | 5/1999 | Spock |
| 5,987,076 | A | 11/1999 | Zehavi et al. |
| 6,122,311 | A * | 9/2000 | Watanabe et al. .......... 375/147 |
| 6,366,606 | B1 * | 4/2002 | Sriram ..................... 375/150 |
| 2002/0009096 | A1 * | 1/2002 | Odenwalder ............... 370/441 |

* cited by examiner

*Primary Examiner*—Kenneth Vanderpuye
*Assistant Examiner*—Lawrence B. Williams
(74) *Attorney, Agent, or Firm*—Ronald O. Neerings; Wade James Brady, III; Frederick J. Telecky, Jr.

(57) ABSTRACT

A Direct Sequence Spread Spectrum (DSSS) receiver system (100) combines and orders the soft symbols from associated information channels. The system permits a QPSK channel to be demodulated as a pair of BPSK channels, and the soft symbols of the demodulated BPSK channels to be multiplexed into a single information channel. The receiver system (100) includes a plurality of demodulating fingers (102–106). Each demodulating finger accepts modulation parameters and a sample stream, while supplying soft symbols with indexing information so that information channels can be subsequently multiplexed into a single information channel. A method for ordering the soft symbols of associated information channels in a DSSS system is also provided.

19 Claims, 5 Drawing Sheets

SYSTEM AND METHOD FOR DEMODULATING ASSOCIATED INFORMATION CHANNELS IN DIRECT SEQUENCE SPREAD SPECTRUM COMMUNICATIONS

FIELD OF THE INVENTION

This invention relates generally to the field of direct sequence spread spectrum (DSSS) communications and, more particularly, to the demodulation of associated information channels in a code division multiple access (CDMA) RAKE receiver.

BACKGROUND OF THE INVENTION

In spread spectrum communications, such as in CDMA systems, pseudorandom noise (PN) sequences are used to generate spread spectrum signals by increasing the bandwidth (i.e., spreading) of a baseband signal. A forward link waveform transmitted by the base station may be comprised of a pilot waveform and a data waveform. Both of the waveforms are received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (i) demodulating the pilot waveform, (ii) estimating the relative phase and amplitude of the pilot waveform, (iii) correcting the phase of the data waveform using the estimated phase of the pilot waveform, and (iv) adjusting the weight of data symbols used in maximal ratio combining in a RAKE receiver based on the estimated amplitude of the pilot waveform. Steps (iii) and (iv) above are performed as a "dot product" as is known in the art. Conventionally, steps (i) through (iv) are performed in hardware. In other conventional methods, a controller having a central processing unit (CPU) and/or a digital signal processor (DSP) may perform some of the above-described steps.

FIG. 1 illustrates a conventional IS-95A or TIA/EIA-95-B forward link base station transmitter 10 (prior art). A pilot channel 12 is generated that has no data. That is, the data is predetermined to be all "0" bits. The pilot channel is modulated, or covered with a Walsh code from Walsh code generator 14 at 1.2288 Mcps (megachips per second). 64 orthogonal Walsh codes, each of 64 bits, are used in the IS-95A and TIA/EIA-95-B systems. Walsh code $H_0$ is used to modulate the pilot channel.

Also depicted is a traffic or paging channel, which shall be referred to herein as an information channel. Data is input at one of a plurality of data rates from 9.6 kbps (kilobits per second) to 1.2 kbps. The data is encoded at encoder 16, at one bit per two code symbols, so that the output of the encoder 16 varies from 19.2 ksps (kilosymbols per second) to 2.4 ksps. Symbol repetition device 18 repeats the code symbols from 1 to 8 times to create a 19.2 ksps signal. Alternately stated, either 1, 2, 4, or 8 modulation symbols are created per code symbol. Then, the information channel is scrambled with a long code at the same 19.2 ksps rate. Other rates are described in the IS-2000 standard. The information channel is covered with a different Wash code from that used to cover the pilot channel, code $H_T$ for example.

After being modulated with Walsh codes, each channel is spread with a common short code, or PN sequence. Each channel is split into I and Q channels, and spread with I and Q channel PN sequences. A 90 degree phase shift is introduced by multiplying the I channels with a sin function, while the Q channels are being multiplied with a corresponding cosine function. Then, the I and Q channels are summed into a QPSK channel. In the IS-95A and TIA/EIA-95-B standards, the same baseband symbols are assigned to both the I and Q channels. The combination of all the QPSK channels, including pilot, synchronization, paging, and traffic channels can be considered a composite waveform. This composite waveform is then up-converted in frequency (not shown) and transmitted.

FIG. 2 is a conventional IS-95A or TIA/EIA-95-B CDMA receiver (prior art). At the mobile station receiver 50 the transmitted signals are accepted as analog information, and converted into a digital I and Q sample stream at A/D 52. Conventionally, a multi-finger RAKE is used to variably delay and amplify multipath delays in the sample stream, so that degradation due to fading can be minimized. Three demodulating fingers, demodulating finger 1 (54), demodulating finger 2 (56), and demodulating finger 3 (58) all receive the same I and Q sample stream, which has been represented as a single line for simplicity. Each demodulating finger is assigned one of the sample stream multipath delays. PN codes and Walsh codes are generated with delays consistent with the multipath delays of the sample stream to be demodulated. The sample stream from the multipaths is coherently combined in combiner 60 based on a maximal ratio combining (MRC) principle.

The IS-2000 standards propose, and future uses will include multiple information channels with a variety of symbol rates. A variety of symbol accumulation periods will be required in the process of demodulating these information channels. In IS-95A and TIA/EIA-95-B standard communications, a symbol is conventionally spread with 64 PN chips at the transmitter. At the receiver, the symbol is recovered by despreading, uncovering, and accumulating the symbol over a period of 64 PN chips. The accumulated symbol is called a soft symbol. Conventionally, the soft symbol is corrected with respect to phase and weighted with respect to amplitude after accumulation, using the pilot waveform as a phase and amplitude reference.

The receiver 50 may also receive a sample stream including signals from more than one base station. The base stations are precisely timed and synchronized using offsets of the PN spreading code. That is, the sample stream received from two different base stations has delays that are typically much larger than multipath delays. The receiver 50 has diversity characteristics which permit it to demodulate the sample stream from multiple base stations, for the purpose of a handoff for example.

In some conventional CDMA RAKE receivers, the outputs of multiple demodulating fingers are "hardwired" to combine the common information channels in a sample stream. The decision and data transfer operations of the individual finger channels are predetermined. Hardwiring reduces flexibility, as the finger channels of the demodulating fingers must always be combined with the same partner finger channels. Thus, the number of information channels, the information channel order, and the information channels that can be combined across demodulating fingers are necessarily constricted when the finger channel outputs are connected in a hardwired arrangement. Hardwiring does not permit partner finger channels to be used with different combiner channels. A conventional receiver with a fixed number of finger channels in each demodulating finger can only demodulate such a fixed number of IS-2000 standard information channels.

Alternately, the soft symbols output by the demodulating finger can be buffered and transferred, via a data bus, to a CPU or DSP for combining. This software combining approach provides flexibility, as potentially the finger channels can be combined in any variation. However, the CPU or DSP may not have enough bandwidth to perform the combining operations, nor will such solutions prove power efficient.

To increase the throughput of information in high speed data links, the IS-2000 standards also propose the use of associated information channels that are generated in the transmitter from a single information stream through various demultiplexing methods, for example, QPSK, OTD (orthogonal transmit diversity), and multicarrier modes. The simplest example is the demultiplexing of a single information stream into 2 BPSQ channels transmitted as a QPSK channel.

An IS-2000 receiver should, therefore, receive and demodulate multiple carrier signals, and the corresponding sample streams, as well as process and combine associated information channels. Since size and power consumption are always a serious concern in the design of mobile station receivers, the complexity of the new IS-2000 standard presents the designers with the challenge of expanding receiver capabilities without dramatically increasing the receiver complexity and power consumption.

It would be advantageous if a CDMA receiver could be designed to permit cooperation between demodulating fingers, so that associated information channels from orthogonal sample streams could be efficiently demodulated. It would also be desirable if the soft symbols generated from the associated information channels being demodulated in separate finger channels and separate fingers could be efficiently multiplexed back into a single information channel.

It would be advantageous if the number of demodulating fingers, and the number of finger channels in a demodulating finger that are required to demodulate associated information channels in either the same, or orthogonal sample streams, could be minimized. Such efficient processing of associated information channels would permit the receiver to demodulate a greater number and variety of channels.

SUMMARY OF THE INVENTION

Accordingly, a DSSS communications receiver system is provided for demodulating sample streams that include associated information channels. The system comprises a plurality of demodulating fingers. Each demodulating finger accepts modulation parameters and a sample stream, while supplying soft symbols with indexing information so that information channels can be subsequently multiplexed into a single information channel.

Specifically, each demodulating finger includes a plurality of finger channels which accept the sample stream, while providing the soft symbols of the demodulated information channels. Further, each finger channel includes a pair of parallel BPSK finger channel sections. An index section is associated with each pair of finger channels to supply a symbol index for every soft symbol. The symbols indexes are used to identify the soft symbols for subsequent multiplexing and combining operations. Using the symbol indexes, associated information channels can be efficiently multiplexed into a single information channel.

When the sample stream includes a QPSK information channel, the finger channel sections supply soft symbols at the soft symbol output from a pair of information channels which, when multiplexed, make up a single information channel. When the first and second associated information channel are respectively included in a first and second orthogonal sample stream, a first finger channel in a first demodulating finger supplies soft symbols from the first demodulated information channel, while a second finger channel in a second demodulating finger supplies soft symbols from the second demodulated information channel. Again a symbol index is supplied to identify the associated information channel soft symbols. Likewise, the system can be used for preparing the associated information channels in three or more sample streams for multiplexing.

A method is also provided for indexing the soft symbols of associated information channels. The method comprises: accepting a sample stream; accepting modulation parameters; supplying soft symbols; and supplying indexing information to index the soft symbols. A key feature in the ordering of the soft symbols is the creation of a symbol index.

In some aspects of the invention, accepting modulation parameters includes accepting a code symbols per modulation symbol (CSPMS) value, and a range of symbol index offset values. Then, providing a single information channel includes supplying soft symbols in response to the CSPMS value and the symbol index offsets.

DETAILED DESCRIPTION OF THE PREFERRED EMBODIMENT

Figure 1:
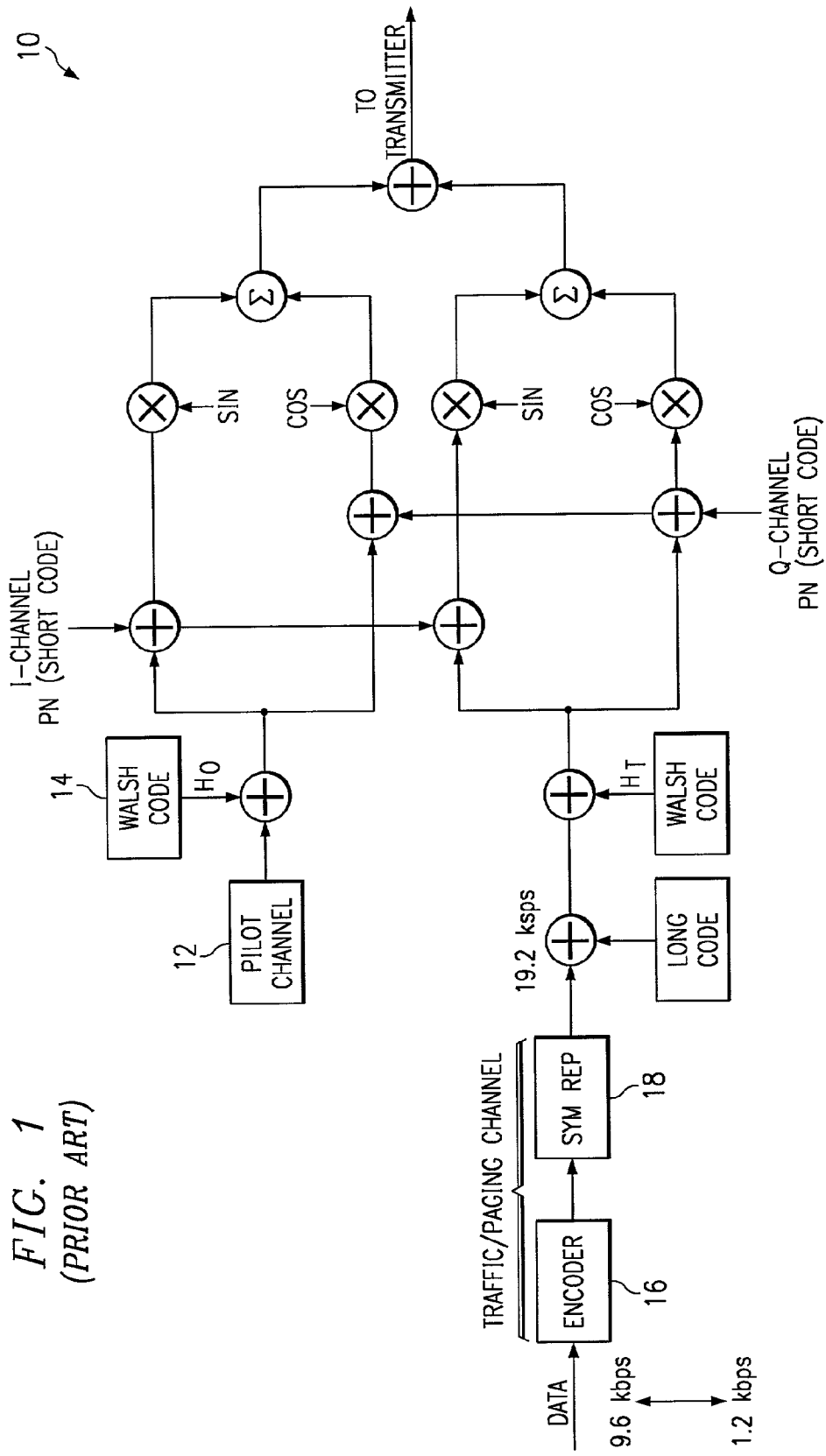
FIG. 1 illustrates a conventional IS-95A or TIA/EIA-95-B forward link base station transmitter section (prior art).
Figure 2:
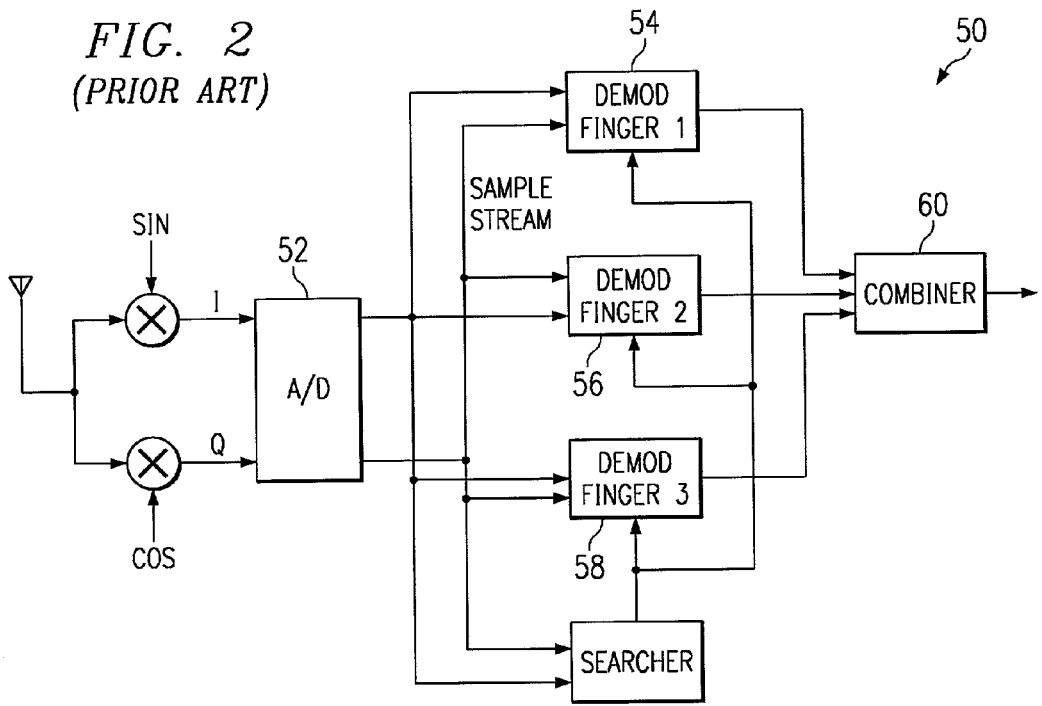
FIG. 2 is a conventional IS-95A or TIA/EIA-95-B CDMA receiver (prior art).
Figure 3:
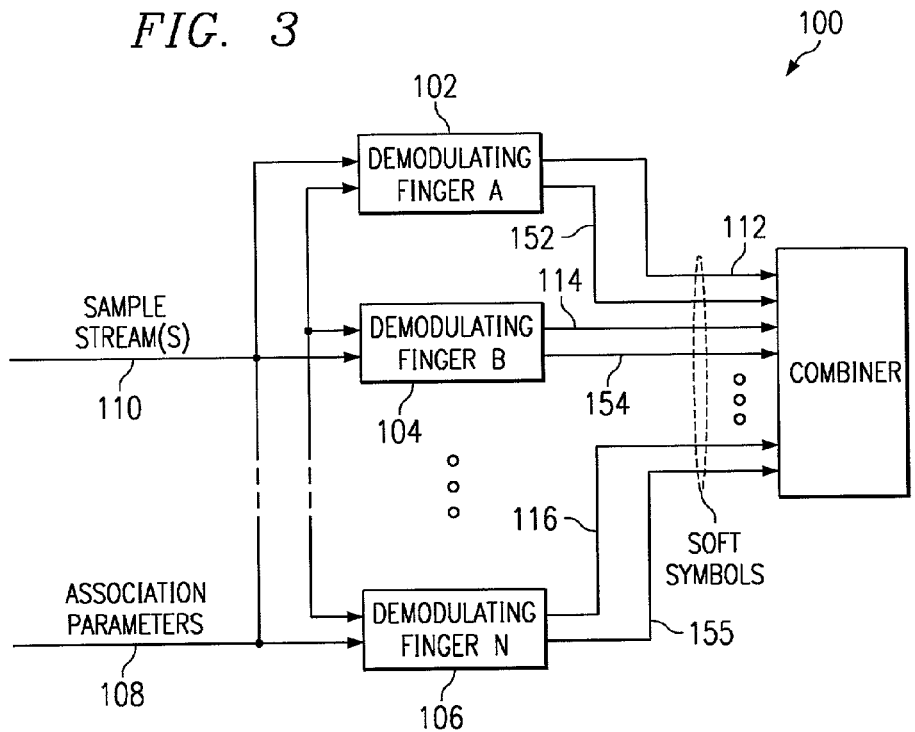
FIG. 3 is a schematic block diagram of the present invention system for demodulating a sample stream including a plurality of associated information channels in a DSSS communications receiver.

FIG. 3 is a schematic block diagram of the present invention system for demodulating a sample stream including a plurality of associated information channels in a DSSS communications receiver. The system 100 includes a plurality of demodulating fingers. Demodulating fingers A (102), B (104), up to n (106) are shown, where n can be any whole number. The invention is not limited to any specific number of demodulating fingers, but one embodiment includes n=6.

Each demodulating finger in the plurality of demodulating fingers 102–106 has a modulation parameter input on line 108 to accept modulation or association parameters and a sample stream input on line 110 to accept a sample stream. Each demodulating finger 102–106 has a soft symbol output to supply ordered soft symbols from associated demodulated information channels. Specifically, demodulating finger A (102) has a soft symbol output on line 112, demodulating finger B (104) has a soft symbol output on line 114, and demodulating finger n (106) has a soft symbol output on line 116.

This invention description repeatedly discusses the selection of a demodulating finger from a plurality of demodulating fingers 102–106. This description is not meant to imply that certain information channels or information channel combinations are predeterminedly associated with specific demodulating fingers. When a demodulating finger A (102) is selected, demodulating fingers B (104) or n (106), could have just as well been selected. Further, the information channel can be demodulated at more than one demodulating finger, such as when multiple demodulating fingers demodulate a sample stream with delays, that correspond to multipath delays in the transmitted signal.

The associated information channel multiplexing operation is selective, through the use of modulation parameter commands on line 108. For example, the sample stream on line 110 includes a BPSK information channel (not in association with other information channels). The information channel is arbitrarily selected to be demodulated at demodulating finger A (102), from the field of demodulating fingers 102–106. The demodulating finger A (102) receives association parameters that indicate the demodulated information channel is to be treated as a conventional information channel. That is, the information channel is not associated with any other information channel.

When the sample stream on line 110 includes a pair of information channels transmitted as a QPSK channel, demodulating finger A (102), or whichever demodulating finger is selected, accepts association parameter input from line 108. Then, the demodulating finger soft symbol output on line 112 supplies soft symbols from the pair of information channels. Indexing information is supplied on line 152 so that the soft symbols can be multiplexing into a single information channel at the combiner.

In some aspects of the invention, the sample stream on line 110 includes a pair of associated BPSK information channels. Association parameters are received on line 108. Then, a demodulating finger, demodulating finger A (102) for example, supplies soft symbols at the soft symbol output on line 112 from the pair of information channels. Indexing information is supplied on line 152 for multiplexing the soft symbols into a single information channel.

In some aspects of the invention, a first and second information channel are respectively included in a first and second orthogonal sample stream on line 110. Then, a first demodulating finger, demodulating finger A (102) for example, supplies soft symbols at the soft symbol output on line 112 from the first information channel. A second demodulating finger, demodulating finger B (104) for example, supplies soft symbols at the soft symbol output on line 114 from the second information channel. The soft symbols of demodulating fingers A (102) and B (104) are supplied with indexing information for multiplexing the soft symbols into a single information channel.

Figure 4:
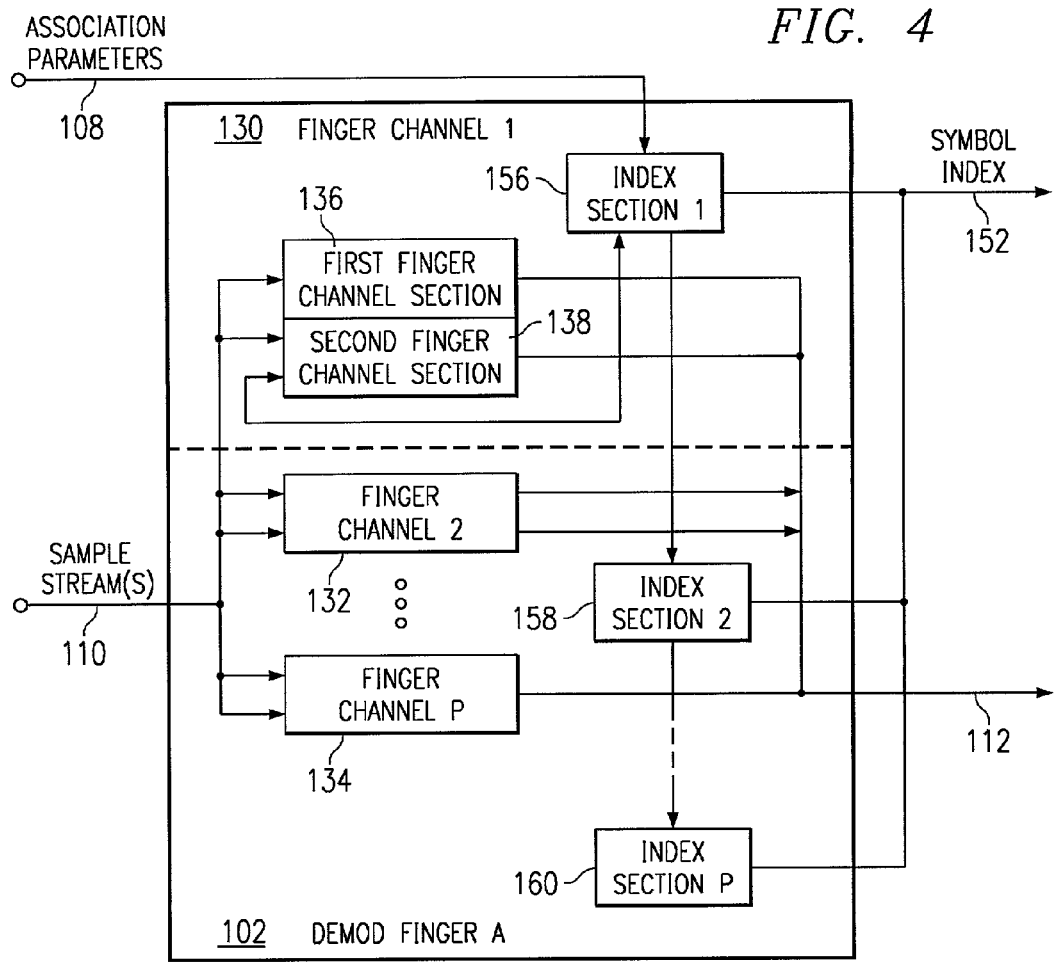
FIG. 4 is a schematic block diagram illustrating demodulating finger A of FIG. 3 in greater detail.

FIG. 4 is a schematic block diagram illustrating demodulating finger A (102) of FIG. 3 in greater detail. Each demodulating finger includes a plurality of finger channels. Demodulating finger A (102) is being used as an example, and it is representative of the other fingers. Finger channel 1 (130), finger channel 2 (132), and finger channel p (134) are depicted, where p can be any whole number. The present invention is not limited to any particular number of finger channels. Each of the finger channels 130–134 includes a sample stream input connected to the demodulating finger sample stream input on line 110, and each index section 156, 158, and 160 accepts association parameters on line 108. Each finger channel 130–134 also includes a soft symbol output connected to the demodulating finger soft symbol output 112, and each index section 156–160 outputs symbol indexes on line 152. As explained in greater detail below, the soft symbols are supplied with an index so that they can be multiplexed into a single information channel.

Using finger channel 1 (130), which is representative of the other finger channels, it can be seen that the finger channel includes a first finger channel section 136 and second finger channel section 138. In some aspects of the invention, finger channel 1 (130) receives a BPSK non-associated information channel on line 110. Then, finger channel 1 (130) supplies soft symbols from the information channel on line 112 which are not ordered with the soft symbols of another information channel.

Once again, this invention description repeatedly discusses the selection of finger channels from a plurality of finger channels. This selection of particular finger channels to exemplify aspects of the invention does not imply that certain information channels or information channel combinations are predeterminedly associated with specific finger channels. Alternately, finger channel 2 (132), finger p (134), or more than one finger channel may also be used for the same information channels. Neither is the description intended to imply predetermined relations with particular demodulating fingers. Although demodulating finger A (102) is depicted in FIG. 4 and used as an example, the present invention description applies to any demodulating finger, or combination of demodulating fingers.

When the sample stream on line 110 includes a pair of associated information channels transmitted as a QPSK channel, finger channel 1 (130), or whichever finger channel is selected, accepts the QPSK information channel into both of the finger channel sections 136 and 138 (see FIG. 4). Finger channel 1 (130) accepts association parameters on line 108. Then, the finger channel sections 136 and 138 supply soft symbols at the soft symbol output from the pair of information channels while indexing information is supplied on line 152 so that the soft symbols can be subsequently multiplexed into a single information channel.

Figure 5:
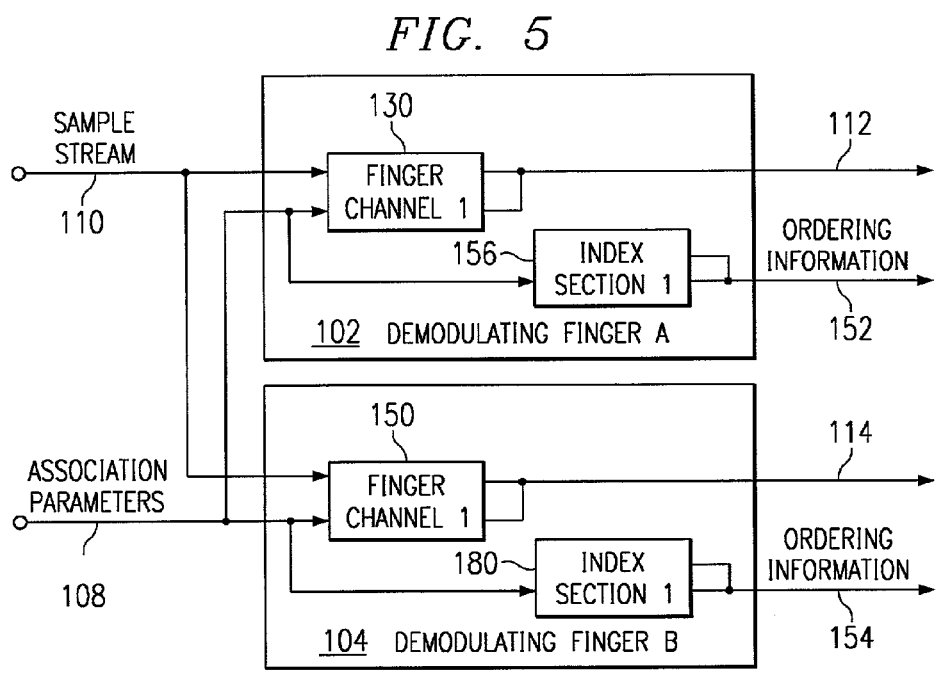
FIG. 5 is a schematic block diagram related to FIGS. 3 and 4 to illustrate the association of information channels across demodulating fingers.

FIG. 5 is a schematic block diagram related to FIGS. 3 and 4 to illustrate the association of information channels across demodulating fingers. In this figure line 110 is intended to represent a pair of lines with first and second orthogonal sample streams. The orthogonal sample streams include, respectively, first and second associated information channels. Finger channel 1 (130) of demodulating finger A (102) supplies soft symbols at the soft symbol output on line 112 from the first information channel. Likewise, second finger channel 150 of demodulating finger B (104), for example, supplies soft symbols at the soft symbol output on line 114 from the second information channel. The soft symbols of the first information channel demodulated by finger channel 1 (130) and the soft symbols of the second information channel demodulated by the second finger channel 150 in demodulating finger B (104) are accompanied by indexing information supplied, respectively, on lines 152 and 154, so that the soft symbols can be subsequently multiplexed into a single information channel.

It should also be understood that the present invention enables multipath combining. For example, when the sample stream on line 110 includes an information channel with a plurality of multipath delays, a plurality of the demodulating fingers, such as demodulating fingers 102/104, receive modulation parameters on line 108. Then, each demodulating finger 102/104 supplies soft symbols from the non-associated information channel at the soft symbol output for combination into a single information channel. The indexing process, described in detail below, makes such multipath combination, as well as associated information channel multiplexing flexible and efficient.

Table 1 illustrates four different examples of how the present invention code symbol index can be used to order soft symbols from associated information channels. The first row represents the simple case where a BPSK non-associated information channel is not multiplexed with another information channel. The CSPMS value is equal to 1, and the channel (0) symbol index offset is equal to "0", so that the channel (0) code symbol index advances as 0, 1, 2, . . .

TABLE 1

| Mode/Min # of FNGs Finger channel section | Accumulator CSPMS value | FNG #/Symbol Index Offset/Symbol Index | | | | | |
|---|---|---|---|---|---|---|---|
| | | first | second | first | second | first | second |
| BPSK/1 | 1 | FNGA/ 0/ 0, 1, 2, . . . | — | — | — | — | — |
| QPSK/1 | 2 | FNGA/ 0/ 0, 2, 4, . . . | FNGA/ 1/ 1, 3, 5, . . . | — | — | — | — |
| OTD/2 | 4 | FNGA/ 0/ 0, 4, 8, . . . | FNGA/ 2/ 2, 6, 10, . . . | FNGB/ 1/ 1, 5, 9, . . . | FNGB/ 3/ 3, 7, 11, . . . | — | — |
| 3XMC/3 | 6 | FNGA/ 0/ 0, 6, 12, . . . | FNGA/ 3/ 3, 9, 15, . . . | FNGB/ 1/ 1, 7, 13, . . . | FNGB/ 4/ 4, 10, 16, . . . | FNGC/ 2/ 2, 8, 14, . . . | FNGC/ 5/ 5, 11, 17, . . . |

Accumulator CSPMS value column: BPSK/1: 1  0, 1, 2, . . . ; QPSK/1: 2  0, 2, 4, . . . ; OTD/2: 4  0, 4, 8, . . . ; 3XMC/3: 6  0, 6, 12, . . .

Figure 6:
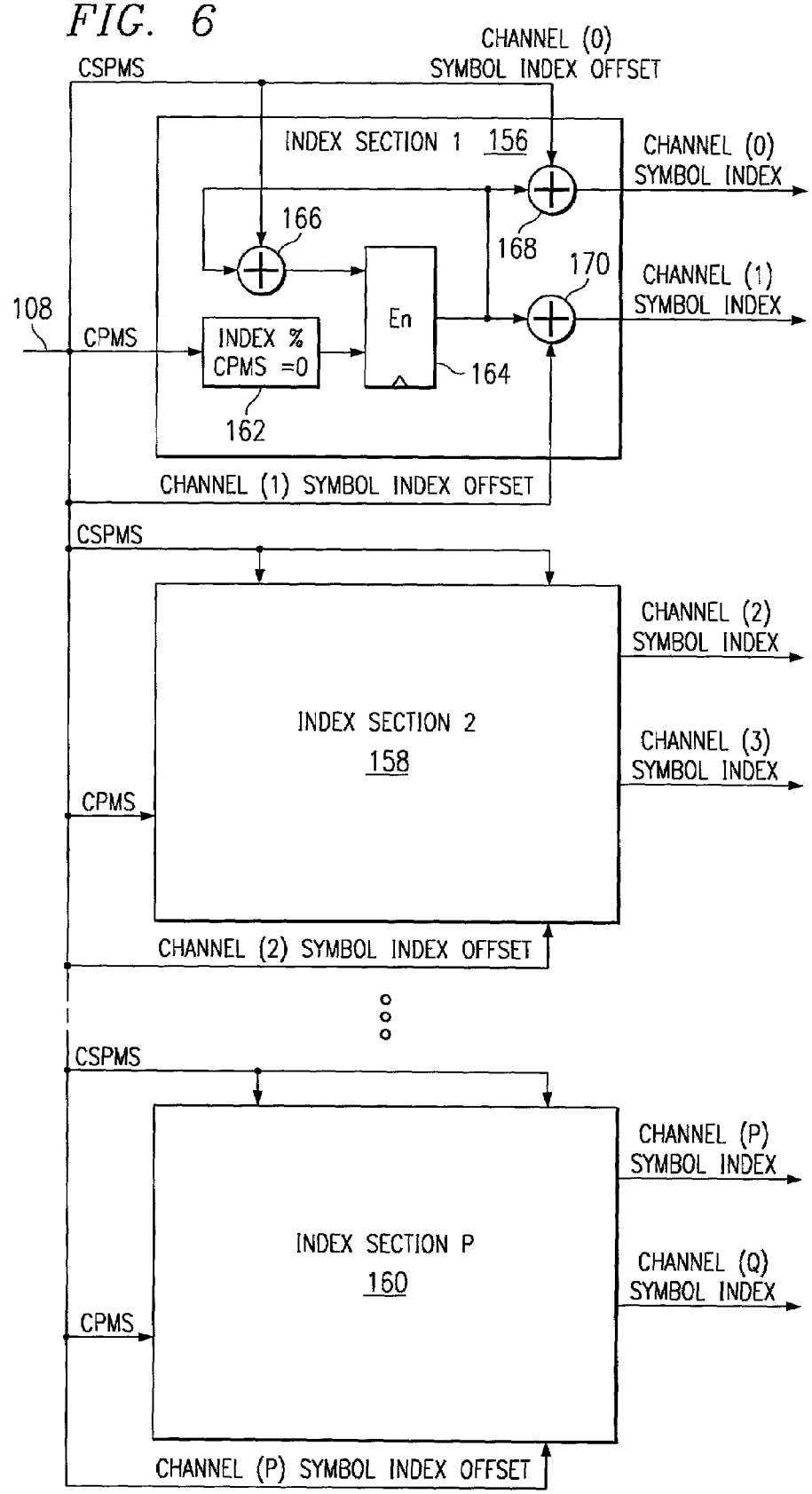
FIG. 6 is a schematic block diagram of the index sections of a demodulating finger that are used to order the soft symbol outputs.

FIG. 6 is a schematic block diagram of the index sections of a demodulating finger that are used to order the soft symbol outputs. Demodulating finger A (102) is used for the following example, but is representative of the other demodulating fingers. Index section 1 (156) cooperates with finger channel 1 (130), see FIG. 4. Likewise, index sections 2 (158) and p (160) cooperate respectively with finger channels 2 (132) and p (134). Index section 1 (156), which is representative of the other index sections, accepts code symbols per modulation symbol (CSPMS) and chips per modulation symbol (CPMS) values at the association parameter input on line 108. CPMS unit 162 controls the accumulate and dump period, which typically varies from 4 to 2048 PN chips. Thus, if the CPMS is equal to 4, the accumulation register, or accumulator 164 is triggered every fourth chip. The CSPMS value is added to the previous output of the accumulation register 164 (the accumulation value) at adder 166. The accumulation value is accumulated at the CPMS rate. For example, if CSPMS=2, then the accumulator values are 0, 2, 4, . . . Index section 1 also accepts index offset values. The channel (0) symbol index offset is accepted by first offset adder 168 and the channel (1) symbol offset is accepted by the second offset adder 170. Thus, the symbol index offsets are the values that are added to the current accumulation value. For example, if CSPMS=2, channel (0) symbol index offset=0, and channel (1) symbol index offset= 1, then the channel (0) code symbol indexes are 0, 2, 4, . . . The channel (1) code symbol indexes are 1, 3, 5, . . . The code symbol indexes are used to order the soft symbols for multiplexing and combining.

Thus, all the soft symbols can be simultaneously supplied to a combiner unit with a code symbol index. This feature permits the code symbols from different finger channels of the same, or different, demodulating fingers to be multiplexed into a single information channel. It also permits the same information channels that are received at different demodulating fingers, and processed as multipath, to be efficiently combined.

Returning briefly to FIG. 4, and studying the second row of Table 1, in some aspects of the invention the sample stream on line 110 includes associated information channels. The first finger channel receives association parameters on line 108. The first and second finger channel sections 136/138 of the first finger channel 130 supply soft symbols on line 112. Index section 1 (156), cooperates with the first finger channel, accepting a CSPMS value=2 and symbol index offsets equal to 0 and 1. For simplicity, the symbol index offset lines are shown as a single line. The finger channel 1 (130) first finger channel section 136 supplies soft symbols with symbol indexes equal to 0, 2, 4, . . . Likewise, the finger channel 1 (130) second finger channel section 138 supplies soft symbols with symbols indexes equal to 1, 3, 5, . . . Again, for simplicity the symbol index lines are shown as a single line.

Returning briefly to FIG. 5, and studying row three of Table 1, in some aspects of the invention first and second orthogonal sample streams on line 110 include associated information channels. The finger channel one 130 in demodulating finger 102 and the finger channel two 150 in a second demodulating finger 104 receive their association parameter inputs on line 108. Index section 1 (156), cooperates with finger channel 1 (130), accepting a CSPMS value=4 and symbol index offsets equal to 0 and 2;

A second index section 180 cooperates with finger channel one 150, accepting a CSPMS value=4 on line 108 and symbol index offsets equal to 1 and 3. Finger channel 1 (130) first finger channel section 136 (see FIG. 4) supplies soft symbols with symbol indexes equal to 0, 4, 8, . . . , and finger channel 1 (130) second finger channel section 138 supplies soft symbols with symbol indexes equal to 2, 6, 10, . . . Likewise, finger channel 1 (150) first finger channel section (not shown) supplies soft symbols with symbol indexes equal to 1, 5, 9, . . . , and finger channel 1 (150) second finger channel section (not shown) supplies soft symbols with symbol indexes equal to 3, 7, 11, . . .

Figure 7:
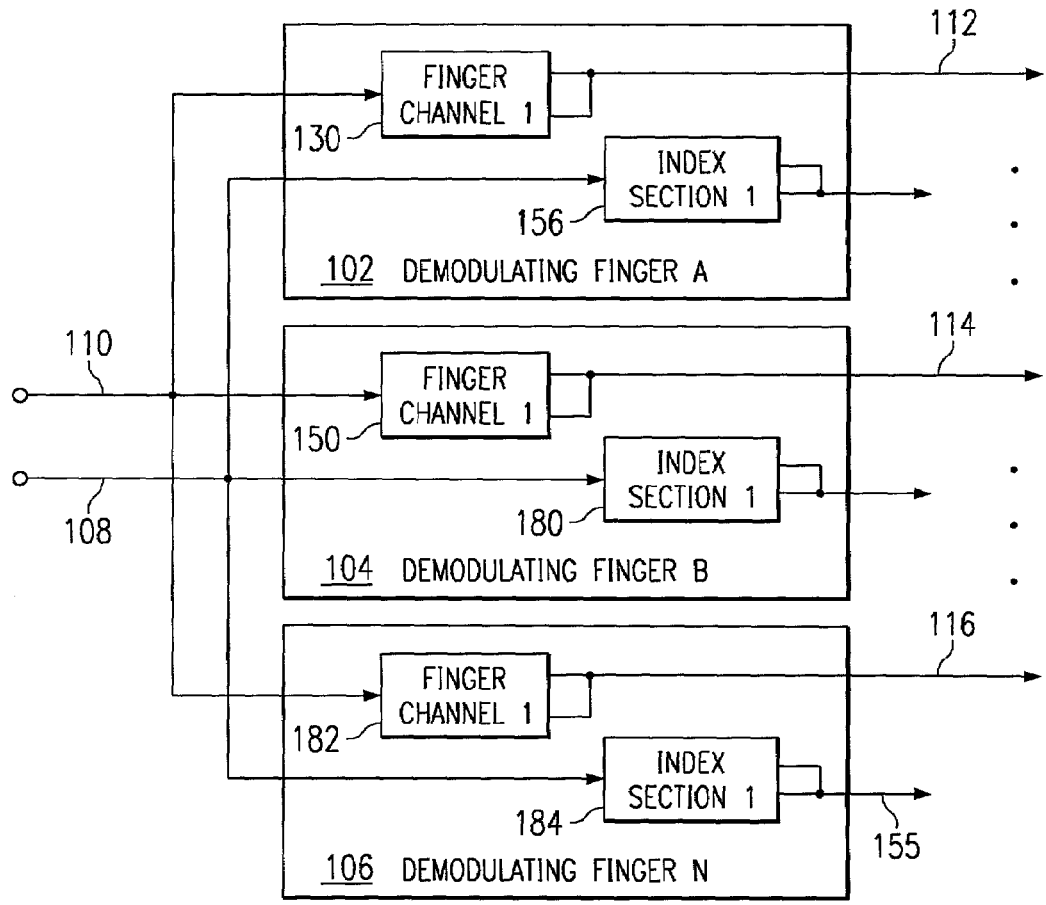
FIG. 7 is a schematic block diagram illustrating a multicarrier example of the present invention.

FIG. 7 is a schematic block diagram illustrating a multicarrier example of the present invention. FIG. 7 relates to the fourth row of Table 1 (3XMC). First, second, and third multicarrier sample streams are carried on separate lines, although only a single line 110 is shown for simplicity. The multicarrier sample streams include associated information channels. First finger channel 1 (130) in demodulating finger A (102), a second finger channel 150 in demodulating finger B (104), and a third finger channel 182 in demodulating finger n (106) receive their association parameter inputs on line 108.

Index section 1 (156) cooperates with finger channel 1 (130), accepting a CSPMS value=6 and symbol index offsets equal to 0 and 3. Index section 180 cooperates with the second finger channel 150, accepting a CSPMS value=6 and symbol index offsets equal to 1 and 4. Index section 184 cooperates with the third finger channel 182, accepting a CSPMS value=6 and symbol index offsets equal to 2 and 5

Finger channel one first finger channel section 136 supplies soft symbols with symbol indexes equal to 0, 6, 12, ... and finger channel one second finger channel section 138 supplies soft symbols with symbol indexes equal to 3, 9, 15, ... The second finger channel 150 first finger channel section (not shown) supplies soft symbols with symbol indexes equal to 1, 7, 13, ... and the second finger channel 150 second finger channel section (not shown) supplies soft symbols with symbol indexes equal to 4, 10, 16, ... The third finger channel 182 first finger channel section (not shown) supplies soft symbols with symbol indexes equal to 2, 8, 14, ... and the third finger channel 182 second finger channel section (not shown) supplies soft symbols with symbol indexes equal to 5, 11, 17, ...

It should be understood that although examples have been given above for two, four, and six information channels, the present invention system can be extended to any number of associated information channels.

Figure 8:
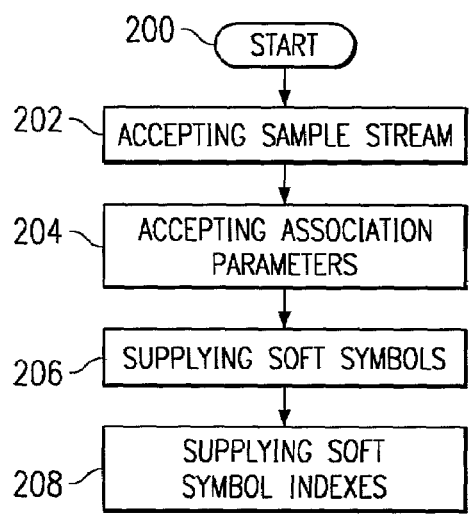
FIG. 8 is a flowchart illustrating a method for indexing the soft symbols of associated information channels, in a direct sequence spread spectrum (DSSS) communications receiver.

FIG. 8 is a flowchart illustrating a method for indexing the soft symbols of associated information channels in a direct sequence spread spectrum (DSSS) communications receiver. Although the method is depicted as a sequence of numbered steps for clarity, no order should be inferred from the numbering unless explicitly stated. The method starts at Step 200. Step 202 accepts at least one sample stream including associated information channels. Step 204 accepts association parameters. Step 206 supplies soft symbols. Step 208 supplies indexing information for the soft symbols.

In some aspects of the invention, accepting association parameters in Step 202 includes accepting a code symbols per modulation symbol (CSPMS) value. Accepting association parameters in Step 204 also includes accepting symbol index offset values. Supplying indexing information in Step 208 includes supplying a symbol index for soft symbols in response to the CSPMS value and the symbol index offset.

In some aspects of the invention, accepting the sample stream in Step 202 includes accepting associated first and second information channels. Accepting association parameters in Step 204 includes accepting a CSPMS=2, and symbol index offsets in the range from 0 to 1. Supplying soft symbols in Step 206 includes supplying soft symbols from the first and second information channels. Supplying indexing information in Step 208 includes supplying a symbol index with each soft symbol from the first and second associated information channels.

In some aspects of the invention, supplying soft symbols in Step 206 includes supplying soft symbols from the first information channel with symbol indexes equal to 0, 2, 4, ... and supplying soft symbols from the second information channel with symbol indexes equal to 1, 3, 5, ...

In other aspects of the invention, accepting at least one sample stream in Step 202 includes accepting first and second orthogonal sample streams with respective first and second associated information channels. Accepting association parameters in Step 204 includes accepting a CSPMS=4, and symbol index offsets in the range from 0 to 3. Supplying soft symbols in Step 206 includes supplying soft symbols from the first and second information channels. Supplying indexing information in Step 208 includes supplying a symbol index with each soft symbol from the first, second, and third associated information channels.

In some aspects of the invention, Step 206 supplies soft symbols from the first information channel with the symbol indexes equal to 0, 2, 4, ... and supplying soft symbols from the second information channel with symbol indexes equal to 1, 3, 5, ...

In some aspects of the invention, accepting at least one sample stream in Step 202 includes accepting a first, second, and third sample stream with respective first, second, and third information channels. Accepting association parameters in Step 204 includes accepting a CSPMS=6, and symbol index offsets in the range from 0 to 5. Supplying indexing information in Step 208 includes supplying a symbol index with each soft symbol from the first, second, etc. associated information channels.

In some aspects of the invention, supplying soft symbols in Step 206 includes supplying soft symbols from the first information channel with symbol indexes equal to 0, 3, 6, ..., supplying soft symbols from the second information channel with symbol indexes equal to 1, 4, 7, ..., and supplying soft symbols from the third information channel with symbol indexes equal to 2, 5, 8, ...

A system and method has been provided for combining and ordering the soft symbols from associated information channels in a direct sequence spread spectrum (DSSS) receiver. The system permits a QPSK channel to be demodulated as a pair of BPSK channels, and the soft symbols of the demodulated BPSK channels to be multiplexed into a single information channel. Other variations and embodiments of the invention will occur to those skilled in the art.

What is claimed is:

1. In a direct sequence spread spectrum (DSSS) communications receiver, a system for ordering the soft symbols from associated information channels in a sample stream, the system comprising:
   at least one demodulating finger having an output to supply soft symbols;
   at least one index section corresponding to the demodulating finger and having an output to supply indexing information for multiplexing the soft symbols output by the demodulating;
   wherein the demodulating finger has an input to receive the sample stream; and
   wherein the index section has an input to accept association parameters, and wherein the index section output supplies an index value for each soft symbol.

2. The system of claim 1 in which the association parameters include information concerning the number of associated information channels and symbol index offsets;
   wherein the index section includes:
   at least one adder having a first input to accept a first symbol index offset, the first adder having an output to supply a symbol index offset responsive to the first symbol index offset and the number of associated channels.

3. The system of claim 2 wherein each demodulating finger includes a plurality of finger channels and corresponding index sections; and wherein each index section supplies index values for the soft symbols of its corresponding finger channel.

4. The system of claim 3 wherein each finger channel includes a first and second finger channel section to supply soft symbols;

wherein the first adder of each index section supplies an index value for the soft symbols of the first finger channel section of the corresponding finger channel; and each index section further including:

a second adder having a first input to accept a second symbol index offset and an output to supply a symbol index, offset responsive to first symbol index offset and the number of associated channels, for the second finger channel section of the corresponding finger channel.

5. The system of claim 4 in which the input of each index section accepts code symbols per modulation symbol (CSPMS) values and chips per modulation symbols (CPMS) signals; and wherein each index section further includes:

an accumulator having a first input to accept an accumulated CSPMS value, and second input to accept CPMS trigger, and an output to supply an accumulation value in response to the CPMS trigger; and wherein the first and second adders each have a second input connected to the output of the accumulator, and wherein the output of each adder is the sum of the accumulation value and the symbol index offset.

6. The system of claim 5 wherein each index section further includes:

a third adder having a first input connected to the output of the accumulator to accept the accumulation value, a second input to accept the CSPMS value, and an output connected to the input of the accumulator to supply the accumulated CSPMS value; and a CPMS unit having an input to accept the CPMS signal and an output connected to the accumulator trigger to supply the trigger signal in response to a modulation symbol being accumulated.

7. In a finger channel of a direct sequence spread spectrum (DSSS) communications receiver demodulating finger, an index section for ordering the soft symbols from associated information channels in a sample stream, the index section comprising:

a first adder having a first input to accept a first symbol index offset, a second input to accept an accumulation value, and an output to supply a symbol index offset that is the sum of the first symbol index offset and the accumulation value;

a second adder having a first input to accept a second symbol index offset and an output to supply a symbol index offset that is the sum of the second symbol index offset and the accumulation value;

a third adder having a first input to accept the accumulation value, a second input to accept a code symbols per modulation symbol (CSPMS) value, and an output to supply an accumulated CSPMS value which is the sum of the accumulation value and the CSPMS value;

a CPMS unit having an input to accept a CPMS signal and an output to supply a CPMS trigger signal in response to a modulation symbol being accumulated; and an accumulator having a first input to accept the accumulated CSPMS value, and second input to accept the CPMS trigger, and an output to supply an accumulation value in response to the CPMS trigger.

8. In a direct sequence spread spectrum (DSSS) communications receiver, a system for ordering the soft symbols from associated information channels in at least one sample stream, the system comprising:

a plurality of demodulating fingers;

wherein each demodulating finger includes a plurality of finger channels with corresponding index sections for each finger channel;

wherein each finger channel has an output to supply soft symbols; and wherein each index section has an output to supply a symbol index value for multiplexing the soft symbols output by its corresponding finger channel.

9. The system of claim 8 wherein each finger channel includes a pair of parallel finger channel sections;

wherein each index section has a first input to accept a code symbols per modulation symbol (CSPMS) value, a second input to accept a first symbol index offset, and a third input to accept a second symbol index offset, and wherein each index section has a first symbol index output responsive to the CSPMS and the first symbol index offset, and a second symbol index output responsive to the CSPMS and the second symbol index offset; and wherein the first and second code symbol indexes of each index section are used for multiplexing the soft symbols of the first and second finger channel sections of the corresponding finger channel.

10. The system of claim 9 wherein a first index section, cooperating with a first finger channel, accepts a CSPMS value=2 and symbol index offsets equal to 0 and 1;

wherein the first finger channel section supplies soft symbols with symbol indexes equal to 0, 2, 4, . . . ; and wherein the second finger channel section supplies soft symbols with symbol indexes equal to 1, 3, 5, . . . .

11. The system of claim 9 in which a first and second orthogonal sample streams, with associated information channels, are included;

wherein the first index section, cooperating with a first finger channel in a first demodulating finger, accepts a CSPMS value=4 and symbol index offsets equal to 0 and 2;

wherein a second index section, cooperating with a second finger channel in a second demodulating finger, accepts a CSPMS value=4 and symbol index offsets equal to 1 and 3;

wherein the first finger channel first finger channel section supplies soft symbols with symbol indexes equal to 0, 4, 8, . . . ;

wherein the first finger channel second finger channel section supplies soft symbols with symbol indexes equal to 2, 6, 10, . . . ;

wherein the second finger channel first finger channel section supplies soft symbols with symbol indexes equal to 1, 5, 9, . . . ; and wherein the second finger channel second finger channel section supplies soft symbols with symbol indexes equal to 3, 7, 11 . . . .

12. The system of claim 9 in which first, second, and third sample streams, with multicarrier associated information channels, are included;

wherein a first index section, cooperating with a first finger channel in a first demodulating finger, accepts a CSPMS value=6 and symbol index offsets equal to 0 and 3;

wherein a second index section, cooperating with a second finger channel in a second demodulating finger, accepts a CSPMS value=6 and symbol index offsets equal to 1 and 4;

wherein a third index section, cooperating with a third finger channel in a third demodulating finger, accepts a CSPMS value=6 and symbol index offsets equal to 2 and 5;

wherein the first finger channel first finger channel section supplies soft symbols with symbol indexes equal to 0, 6, 12, . . . ;

wherein the first finger channel second finger channel section supplies soft symbols with symbol indexes equal to 3, 9, 15, . . . ;

wherein the second finger channel first finger channel section supplies soft symbols with symbol indexes equal to 1, 7, 13, . . . ;

wherein the second finger channel second finger channel section supplies soft symbols with symbol indexes equal to 4, 10, 16, . . . ;

wherein the third finger channel first finger channel section supplies soft symbols with symbol indexes equal to 2, 8, 14, . . . ; and wherein the third finger channel second finger channel section supplies soft symbols with symbol indexes equal to 5, 11, 17, . . . .

13. In a direct sequence spread spectrum (DSSS) communications receiver, a method for indexing the soft symbols of associated information channels, the method comprising:

accepting at least one sample stream including associated information channels;

accepting association parameters;

supplying soft symbols;

supplying indexing information for the soft symbols;

accepting association parameters includes accepting a code symbols per modulation symbol (CSPMS) value;

accepting association parameters includes accepting symbol index offset values; and supplying indexing information includes supplying a symbol index for soft symbols in response to the CSPMS value and the symbol index offset.

14. The method of claim 13 wherein:

accepting the sample stream includes accepting associated first and second information channels;

accepting association parameters includes accepting a CSPMS=2, and symbol index offsets in the range from 0 to 1;

supplying soft symbols from the first and second information channels; and supplying indexing information includes supplying a symbol index with each soft symbol from the first and second associated information channels.

15. The method of claim 14 wherein supplying soft symbols includes supplying soft symbols from the first information channel with symbol indexes equal to 0, 2, 4, . . . and supplying soft symbols from the second information channel with symbol indexes equal to 1, 3, 5, . . . .

16. The method of claim 13 wherein accepting at least one sample stream includes accepting first and second orthogonal sample streams with respective first and second associated information channels;

wherein accepting association parameters includes accepting a CSPMS= 4, and symbol index offsets in the range from 0 to 3;

wherein supplying soft symbols includes supplying soft symbols from the first and second information channels; and wherein supplying indexing information includes supplying a symbol index with each soft symbol from the first and second associated information channels.

17. The method of claim 16 wherein supplying soft symbols includes supplying soft symbols from the first information channel with the symbol indexes equal to 0, 2, 4, . . . and supplying soft symbols from the second information channel with symbol indexes equal to 1, 3, 5, . . . .

18. The method of claim 13 wherein accepting at least one sample stream includes accepting a first, second, and third sample stream with respective first, second, and third information channels;

wherein accepting association parameters includes accepting a CSPMS =6, and symbol index offsets in the range from 0 to 5; and wherein supplying indexing information includes supplying a symbol index with each soft symbol from the first, second, and third associated information channels.

19. The method of claim 18 wherein supplying soft symbols includes supplying soft symbols from the first information channel with symbol indexes equal to 0, 3, 6, . . . , supplying soft symbols from the second information channel with symbol indexes equal to 1, 4, 7, . . . , and supplying soft symbols from the third information channel with symbol indexes equal to 2, 5, 8, . . . .

* * * * *